(12) United States Patent
Kim et al.

(10) Patent No.: US 8,277,105 B2
(45) Date of Patent: Oct. 2, 2012

(54) BACKLIGHT ASSEMBLY AND METHOD OF MANUFACTURING LIGHT GUIDE PLATE THEREFOR

(75) Inventors: Hyoung-Joo Kim, Uiwang-si (KR); Jaejoong Kwon, Suwon-si (KR); Sung-Kyu Shim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 519 days.

(21) Appl. No.: 12/500,316

(22) Filed: Jul. 9, 2009

(65) Prior Publication Data

US 2010/0208496 A1 Aug. 19, 2010

(30) Foreign Application Priority Data

Feb. 13, 2009 (KR) .................. 10-2009-0012037

(51) Int. Cl.
*F21V 7/04* (2006.01)
(52) U.S. Cl. .................. 362/609; 362/624; 362/625
(58) Field of Classification Search ............... 362/606, 362/607, 608, 609, 617, 619, 620, 623, 624, 362/625; 264/1.24
See application file for complete search history.

(56) References Cited

U.S. PATENT DOCUMENTS

| 6,843,587 B2 * | 1/2005 | Park et al. ............... 362/331 |
| 7,298,434 B2 * | 11/2007 | Jeon ............... 349/62 |
| 7,722,238 B2 * | 5/2010 | Uehara et al. ............... 362/606 |
| 2007/0189040 A1 * | 8/2007 | Chi et al. ............... 362/620 |
| 2008/0158912 A1 * | 7/2008 | Chang et al. ............... 362/628 |

FOREIGN PATENT DOCUMENTS

| JP | 2007-214001 | 8/2007 |
| KR | 10-0513956 | 9/2005 |
| KR | 10-0880938 | 1/2009 |

OTHER PUBLICATIONS

English Abstract for Publication No.: 1020040066410 (10-0513956), Jul. 27, 2004, Korea.
English Abstract for Publication No.: 1020030089529 (for 10-0880938), Nov. 22, 2003, Korea.
English Abstract for Publication No.: 2007-214001, Aug. 23, 2007, Japan.

* cited by examiner

*Primary Examiner* — Thomas Sember
(74) *Attorney, Agent, or Firm* — F. Chau & Associates, LLC

(57) ABSTRACT

A backlight assembly and a manufacturing method of light guide plate of the backlight assembly is provided. The light guide plate includes an incident surface to which light is incident, an exiting surface from which the light exits, and a reflection surface facing the exiting surface. The light guide plate includes recesses provided on the reflection surface recessed toward the exiting surface to scatter the light. Each of the recesses has a depth-to-width ratio of about 0.2 to about 0.33. Two prism sheets are disposed on the light guide plate. Light exits from the light guide plate at an angle of about 25 degrees to about 30 degrees.

13 Claims, 14 Drawing Sheets

BACKLIGHT ASSEMBLY AND METHOD OF MANUFACTURING LIGHT GUIDE PLATE THEREFOR

CROSS-REFERENCE TO RELATED APPLICATION

This application claims priority to and the benefit of Korean Patent Application No. 10-2009-0012037 filed on Feb. 13, 2009, the entire content of which is incorporated by reference herein.

BACKGROUND

1. Field of the Invention

The present disclosure relates to display devices, and, more particularly, to a backlight assembly for a liquid crystal display device and a method of manufacturing a light guide plate of the backlight assembly.

2. Discussion of the Related Art

In general, a backlight unit for a liquid crystal display serves as an illumination device to uniformly provide light to a liquid crystal display panel of the liquid crystal display. The liquid crystal display panel controls the amount of the light from the backlight assembly to display images.

The liquid crystal display is not a self-emissive device, which is different from other display devices such as cathode ray tubes (CRT), plasma display panels (PDP), field emission displays (FED), or the like, so that the liquid crystal display can become difficult to use under dark conditions in which no light exists. However, since the backlight unit can provide the liquid crystal display panel with light, the liquid crystal display can be used under dark conditions.

The backlight unit typically includes a light source that emits light, a light guide plate that guides the light to the liquid crystal display panel from the light source, a reflection sheet that reflects light leaked from the light guide plate, and an optical sheet that diffuses and condenses the light from the light guiding plate.

Recently, light emitting diodes have been widely used in liquid crystal displays instead of cold cathode fluorescent lamps given the need for slimness and lightness of the typical liquid crystal display. However, a light emitting diode serves as merely a point light source, so that the irradiation range of the light emitting diode is narrower than that of the cold cathode fluorescent lamp.

As a result, in the light incident region of the light guide plate, a brightness difference occurs between the area proximal to the light emitting diodes, i.e., a bright area, and the area between the light emitting diodes, i.e., a dark area, that is generally referred to as a "hot spot". Typically, the image quality of the liquid crystal display deteriorates as a result of the hot spot.

Further, when various additional parts, such as diffusion sheets, brightness enhancement film, and the like, are used in an attempt to improve the image quality deteriorated by hot spots, the thickness and the manufacturing cost of the liquid crystal display increases.

SUMMARY

In accordance with an exemplary embodiment of the present invention a backlight assembly is provided that is capable of improving brightness while reducing the number of sheets employed.

In accordance with an exemplary embodiment of the present invention a method of manufacturing a light guide plate for the backlight assembly is also provided.

In accordance with an exemplary embodiment of the present invention, a backlight assembly includes a light source that emits light and a light guide plate that receives the light, that changes a path of the light, and that outputs the light. The light guide plate includes an incident surface to which the light is incident and that is adjacent to the light source, an exiting surface from which the light exits and that extends from a first end of the incident surface, a reflection surface that extends from a second end of the incident surface and that faces the exiting surface, and a recessed-carving scattering pattern of recesses on the reflection surface toward the exiting surface to scatter the light incident to the light guide plate, the recesses having a depth-to-width ratio of about 0.2 to about 0.33 and the reflection surface having an uneven surface roughness.

The recessed-carving scattering pattern may scatter the light such that light exiting from the exiting surface has an angle of about 25 degrees to about 30 degrees with respect to an imaginary direction line that is substantially vertical to the exiting surface.

The recesses are may be dot shaped when viewed orthogonal to the reflection surface.

A number of the recesses per unit area may increase as a distance between the incident surface and a position at which a recess is formed increases.

A number of the recesses per unit area in an area adjacent to the incident surface, may increase when a thickness of the light guide plate decreases.

The backlight assembly may further include a reflection sheet disposed adjacent the reflection surface to reflect light leaked from the light guide plate back toward the light guide plate.

The light guide plate may further include an embossment adjacent to a respective recess and that protrudes from the reflection surface to separate the reflection sheet and the reflection surface.

A sum of a width of the recess and twice a width of the embossment may be 100 micrometers or less.

The light guide plate may have a thickness of about 0.6 millimeters to about 1.2 millimeters, and the recess may have a depth of about 5 micrometers to about 30 micrometers.

The embossment may have an uneven height and a height of the embossment may be about 1.65 micrometers or more.

At least one prism sheet may be disposed on the exiting surface to condense the light exiting from the light guide plate.

The at least one prism sheet may include a first prism sheet having a plurality of first prisms extending substantially parallel to the exiting surface in a first direction, and a second prism sheet having a plurality of second prisms extending substantially parallel to the exiting surface in a second direction substantially perpendicular to the first direction.

The light source may include a plurality of light emitting diodes.

The light sources may be positioned adjacent to the incident surface.

In accordance with an exemplary embodiment of the present invention a method of manufacturing a light guide plate is provided. A plate is provided having an incident surface to which a light is incident, an exiting surface from which the light exits and extending from a first end of the incident surface, and a reflection surface extending from a second end of the incident surface and facing the exiting surface. A laser is irradiated onto the reflection surface to form a recessed-carving scattering pattern having recesses recessed into the reflection surface toward the exiting surface and an embossment adjacent to respective recesses. The recesses have a depth-to-width ratio of about 0.2 to about 0.33.

The light guide plate may be formed by extrusion molding.

As a result, brightness of the backlight assembly may be improved and the number of the sheets for the backlight assembly may be reduced.

BRIEF DESCRIPTION OF THE DRAWINGS

Exemplary embodiments of the present invention will now be presented with reference to the following detailed description in conjunction with the accompanying drawings, wherein:

FIGS. 3A-1, 3A-2, 3B-1, 3B-2, 3C-1, 3C-2, 3D-1 and 3D-2 show exemplary recess dimensions and corresponding brightness distributions as a function of light exiting angle;

FIGS. 4A-1, 4A-2, 4B-1, 4B-2, 4C-1, 4C-2, 4D-1 and 4D-2 show exemplary embossment dimensions and corresponding brightness distributions as a function of light exiting angle;

DETAILED DESCRIPTION OF THE EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers refer to like elements throughout.

Figure 1:
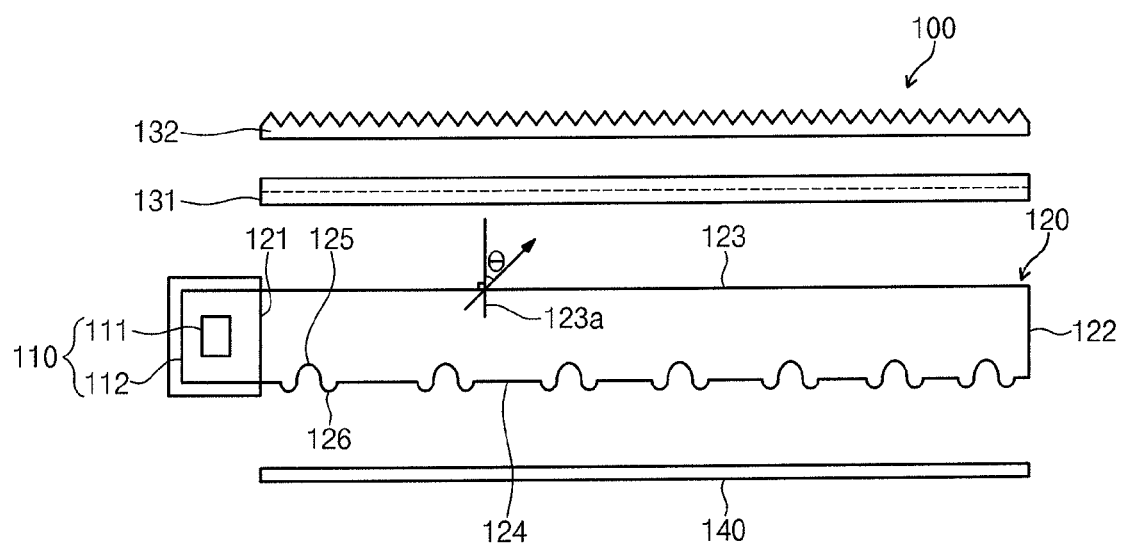
FIG. 1 is a sectional view showing an exemplary embodiment of a backlight assembly according to the present invention.
Figure 2:
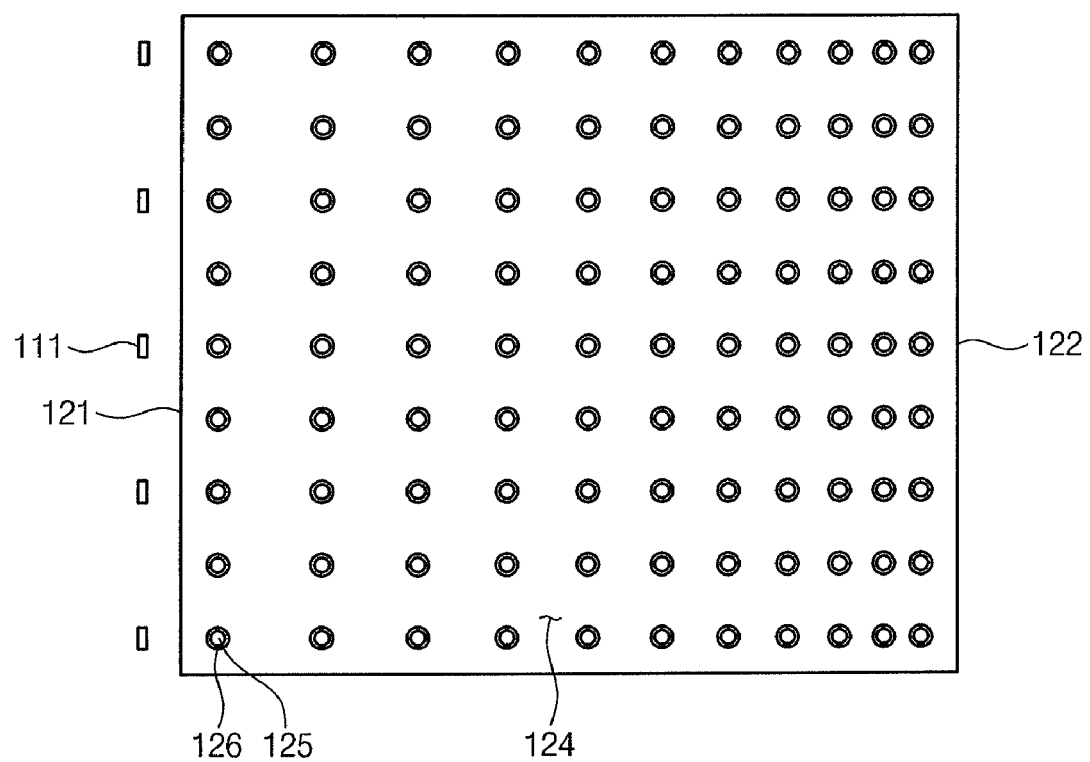
FIG. 2 is a plan view showing light sources and a light guide plate of FIG. 1.

Referring now to FIGS. 1 and 2, a backlight assembly 100 includes a light source unit 110, a light guide plate 120, a reflection sheet 140, a first prism sheet 131, and a second prism sheet 132.

The light source unit 110 includes a light source 111 that emits light and a light source cover 112 that covers the light source 111. The light source 111 includes at least one light emitting diode. The light source cover 112 covers the light emitting diode and is partially opened. The light source cover 112 reflects the light emitted from the light emitting diode toward the opened portion thereof. One end of the light guide plate 120 is coupled with the light source cover 112 through the opened portion of the light source cover 112, so that the light source cover 112 can increase the amount of light supplied to the light guide plate 120.

The light guide plate 120 has a rectangular plate-like shape and changes the light path of the light from the light source unit 110. Particularly, the light guide plate 120 includes an incident surface 121 on which the light is incident, an opposite surface 122 facing the incident surface 121, an exiting surface 123 from which the light exits and which connects the incident surface 121 and the opposite surface 122, and a reflection surface 124 that connects the incident surface 121 and the opposite surface 122 and faces the reflection sheet 140.

In an exemplary embodiment, the light guide plate 120 is formed by extrusion molding. According to the extrusion molding, the object is heated and by using a die and an extrusion press, the object can be formed in a plate-like or sheet-like shape.

The incident surface 121 corresponds to one of the side surfaces of the light guide plate 120 and is positioned adjacent to the light source unit 110 so as to receive the light emitted from the light source unit 110. The reflection surface 124 reflects the light incident through the incident surface 121, and the light exits through the exiting surface 123 toward the first and second prism sheets 131, 132.

The first prism sheet 131 includes a first triangular prism pattern that extends substantially parallel to exiting surface 123 of light guide plate 120 in a first direction, and the second prism sheet 132 includes second triangular pattern that also extends substantially parallel to exiting surface 123 of light guide plate 120, but in a second direction substantially perpendicular to the first direction. The second prism sheet 132 is disposed on the first prism sheet 131.

The first and second prism sheets 131, 132 receive and condense the light exiting from the light guide plate 120 to allow the light to advance in a direction substantially vertical to the exiting surface 123 of the light guide plate 120. So that the light can advance in the direction vertical to the exiting surface 123 after passing through the first and second prism sheets 131, 132, the light exiting from the light guide plate 120 has an angle ($\theta$) of about 25 degrees to about 30 degrees (hereinafter, referred to as "exiting angle") with respect to an imaginary direction line 123a that is substantially vertical to the exiting surface 123.

When the brightness distribution of white light exiting from the first and second prism sheets 131, 132 is measured after the white light advancing in a direction vertical to the first and second prism sheets 131, 132 is incident upon the first and second prism sheets 131, 132, the highest brightness of white light is represented at the angle ($\theta$) of about 25 degrees to about 30 degrees.

Therefore, when the light having the exiting angle ($\theta$) of about 25 degrees to about 30 degrees exits from the light guide plate 120, the light then passing through the first and second prism sheets 131, 132 advances in the direction vertical to the exiting surface 123, thereby improving the brightness of the backlight assembly 100.

As described above, to control the exiting angle ($\theta$) of the light exiting from the light guide plate 120, a plurality of recesses 125 in a recessed-carving scattering pattern are provided on the reflection surface 124 of the light guide plate 120. In particular, the recesses 125 are formed by recessing the reflection surface 124 toward the exiting surface 123 to scatter the light incident to the light guide plate 120. In an exemplary embodiment, the light guide plate 120 has a thickness of about 0.6 mm to about 1.2 mm, and the recesses 125 have a depth of about 5 micrometers to about 30 micrometers.

Figures 1, 3A:
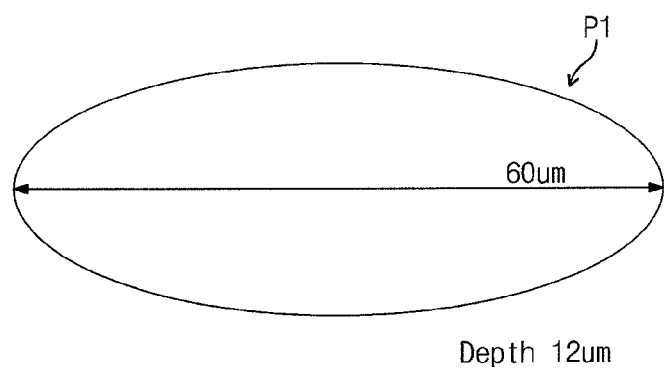
Figures 2, 3A:
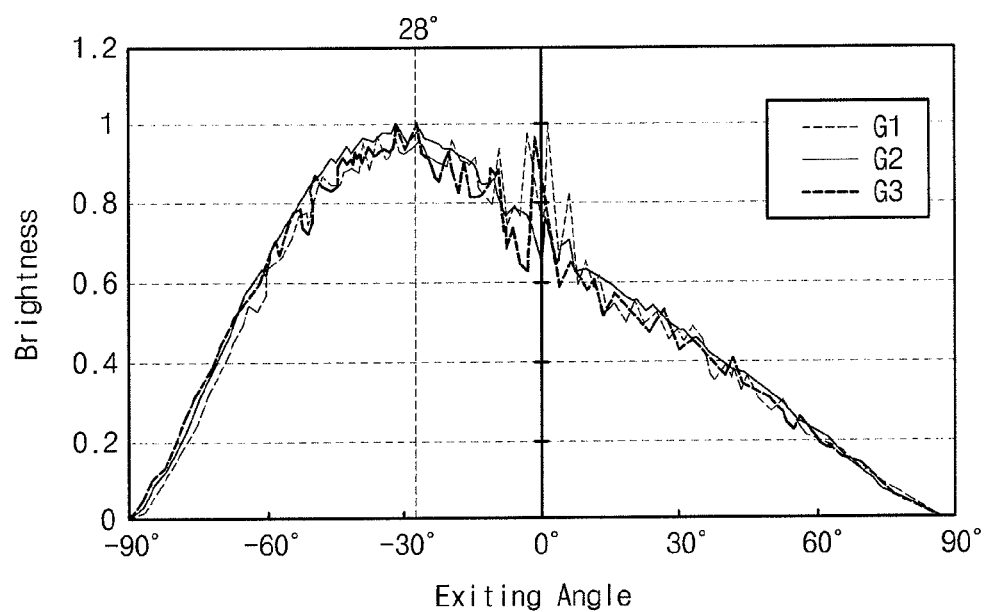
Figures 1, 3B:
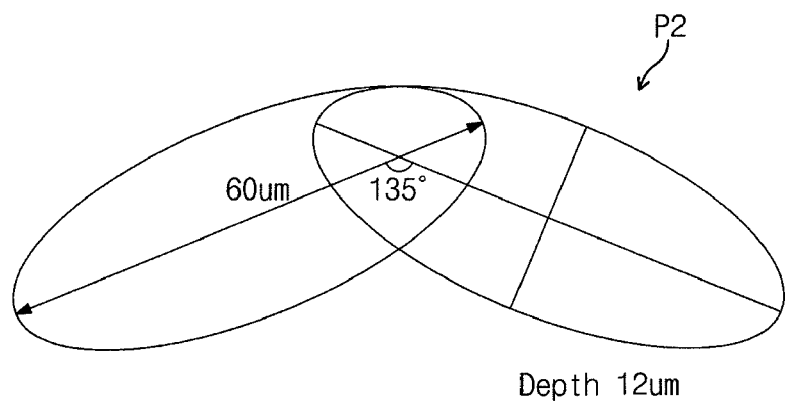
Figures 2, 3B:
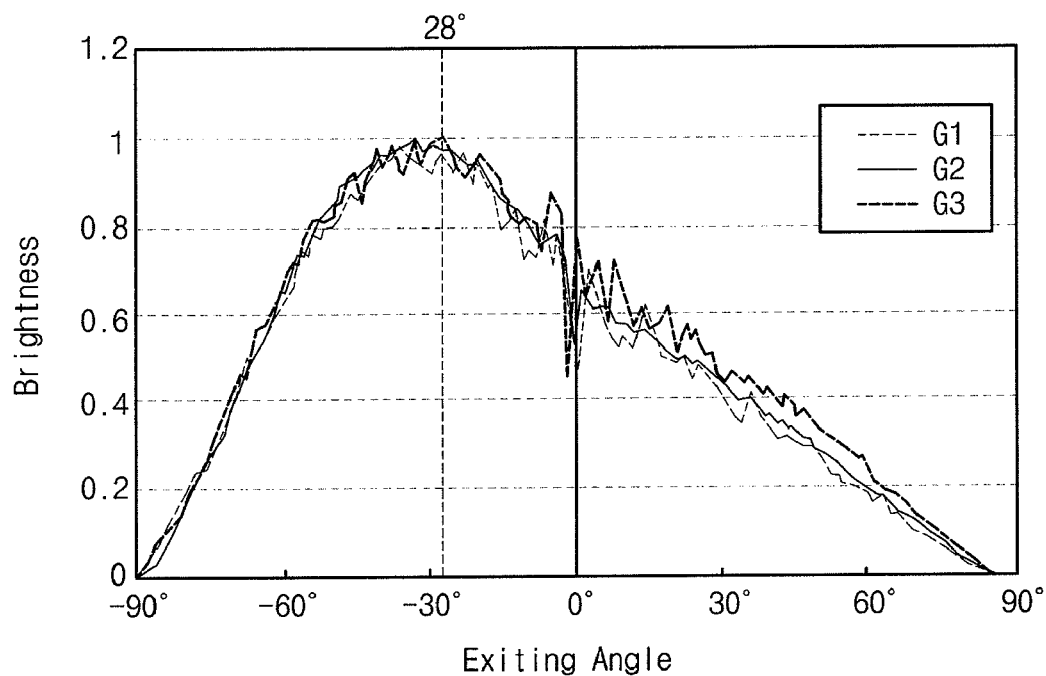
Figures 1, 3C:
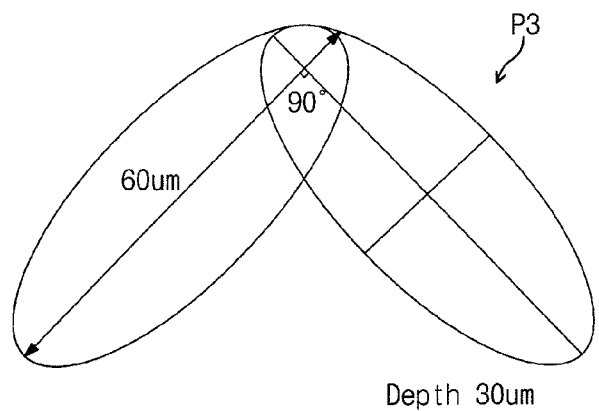
Figures 2, 3C:
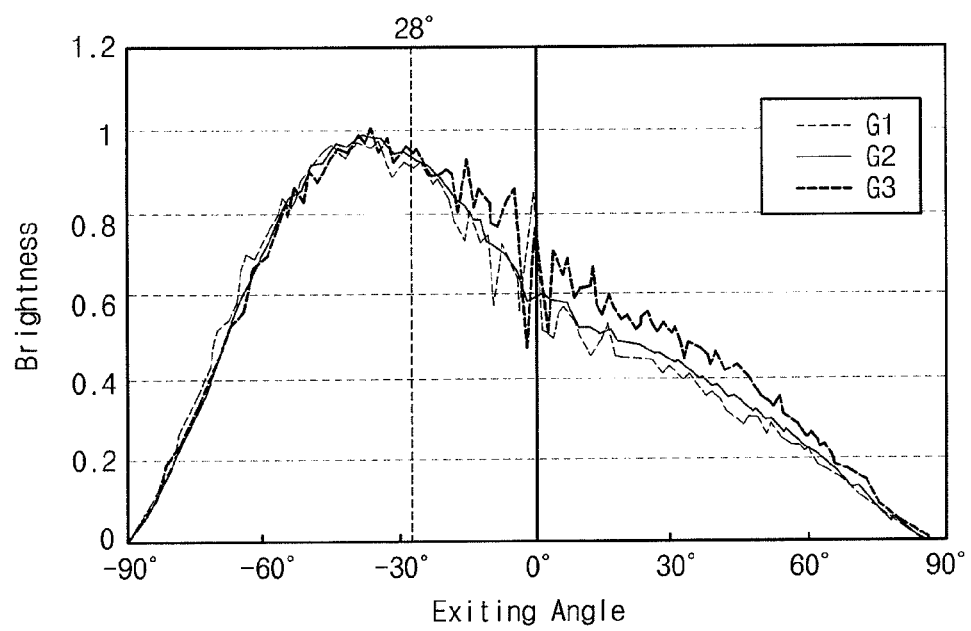
Figures 1, 3D:
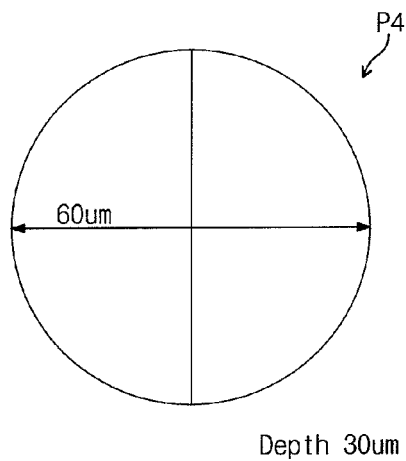
Figures 2, 3D:
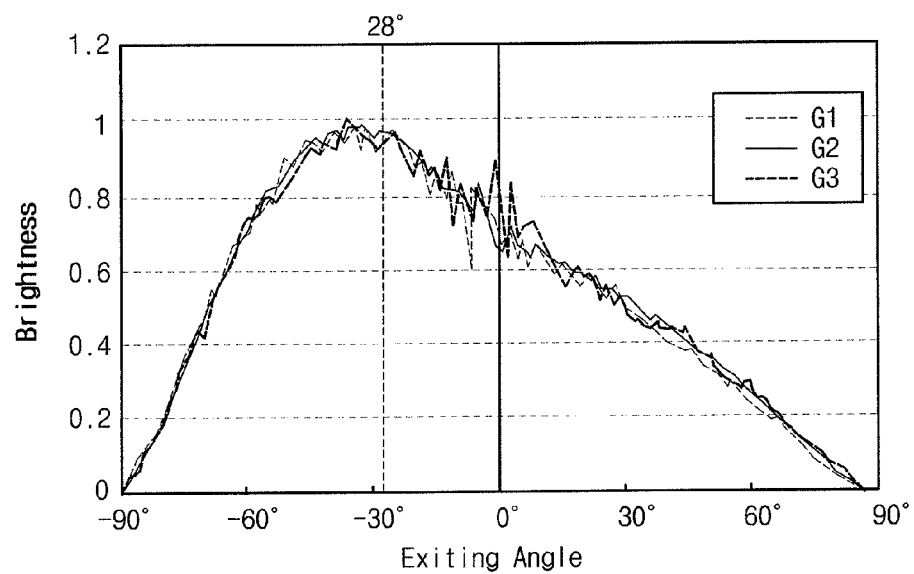

FIGS. 3A-1, 3B-1, 3C-1 and 3D-1 show dimensions of exemplary recesses. Particularly, FIG. 3A-1 shows first recesses P1 having a width of about 60 micrometers and a depth of about 12 micrometers. FIG. 3B-1 shows two second recesses P2 having the same shape as first recesses P1. The two second recesses P2 are partially overlapped with each other such that longitudinal axes of the two second recesses P2 are inclined at about 135 degrees with respect to each other. FIG. 3C-1 shows two third recesses P3 having the same shape as first recesses P1. The two third recesses P3 are partially overlapped with each other such that longitudinal axes of the two third recesses P3 are inclined at about 90 degrees with respect to each other, and each of the third recesses P3 has a depth of about 30 micrometers. FIG. 3D-1 shows fourth recesses P4 having a width of about 60 micrometers and a depth of about 30 micrometers.

FIGS. 3A-2, 3B-2, 3C-2 and 3D-2 show brightness distribution as a function of light exiting angle for the respective FIGS. 3A-1, 3B-1, 3C-1 and 3D-1 recess dimensions.

Referring to FIGS. 3A-1, 3A-2, 3B-1 and 3B-2, in case where the first and second recesses P1, P2 are formed on the reflection surface 124, the brightness of the light was highest when the exiting angle (θ) is about 28 degrees. That is, when a depth-to-width ratio of each of the first and second recesses P1, P2 is about 0.2, the light having the exiting angle (θ) of about 28 degrees exits from the light guide plate 120. As shown in FIGS. 3C-1, 3C-2, 3D-1 and 3D-2, however, the brightness was highest at the exiting angle (θ) greater than 28 degrees when the third and fourth recesses P3, P4 are formed on the reflection surface 124. That is, when a depth-to-width ratio of each of the third and fourth recesses P3, P4 is about 0.5, the light having the exiting angle (θ) greater than an exiting angle of about 30 degrees exits from the light guide plate 120.

In other words, when the depth-to-width ratio increases over 0.5, front brightness and viewing angle of the light exiting from the light guide plate 120 are degraded. Accordingly, in the present exemplary embodiment the depth-to-width ratio is set to a value smaller than 0.5, and the recesses 125 have the depth-to-width ratio of about 0.2 to about 0.33.

In FIGS. 3A-2, 3B-2, 3C-2 and 3D-2, a first graph G1 represents a brightness distribution at a first area of the exiting surface 123, which is near the incident surface 121 of the light guide plate 120. A second graph G2 represents a brightness distribution at a center area of the exiting surface 123. A third graph G3 represents a brightness distribution at a second area of the exiting surface 123, which is near the opposite surface 122 of the light guide plate 120.

As shown in FIGS. 3A-2, 3B-2, 3C-2 and 3D-2, when the recesses 125 are formed on the reflection surface 124, brightness differences do not occur between the first area, the center area, and the second area without relation to shape of the recesses 125.

Figures 1, 4A:
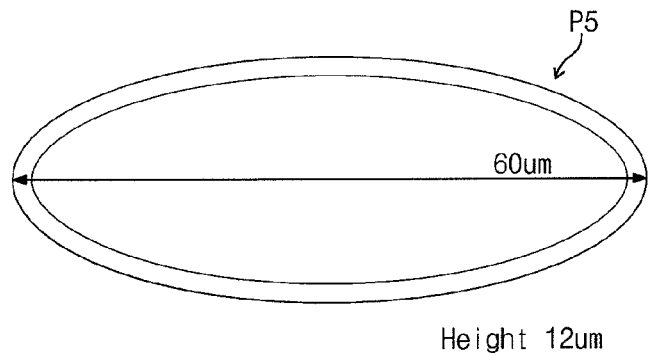
Figures 2, 4A:
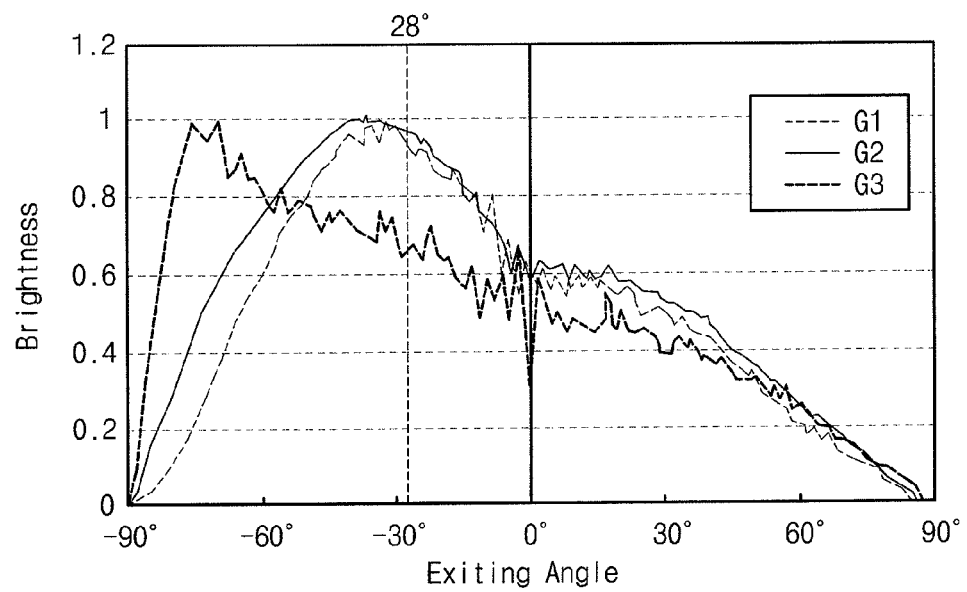
Figures 1, 4B:
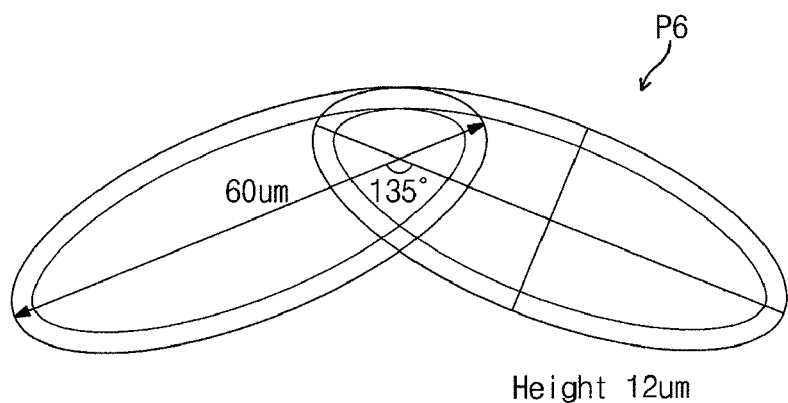
Figures 2, 4B:
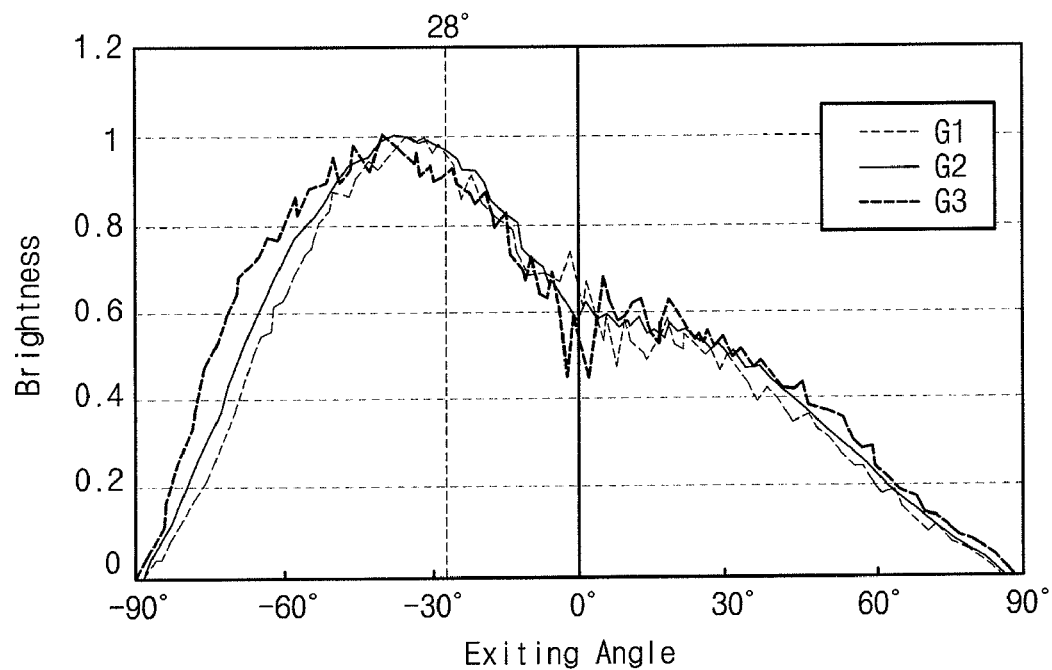
Figures 1, 4C:
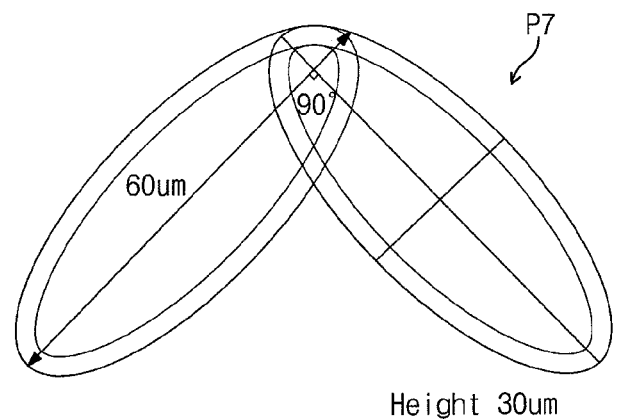
Figures 2, 4C:
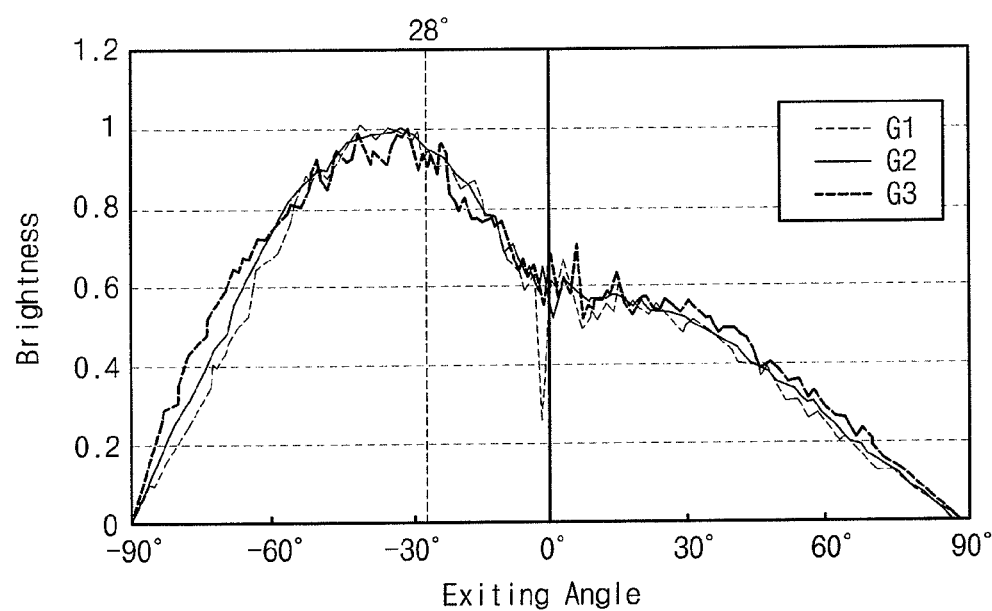
Figures 1, 4D:
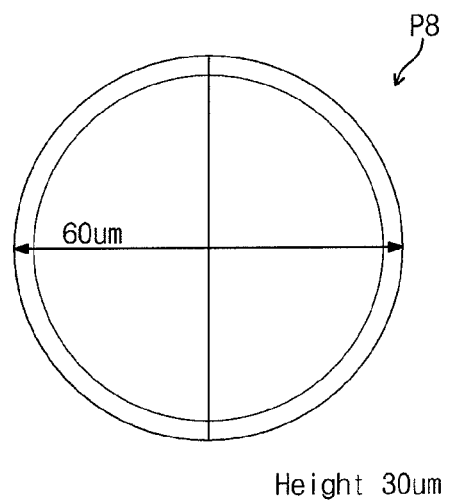
Figures 2, 4D:
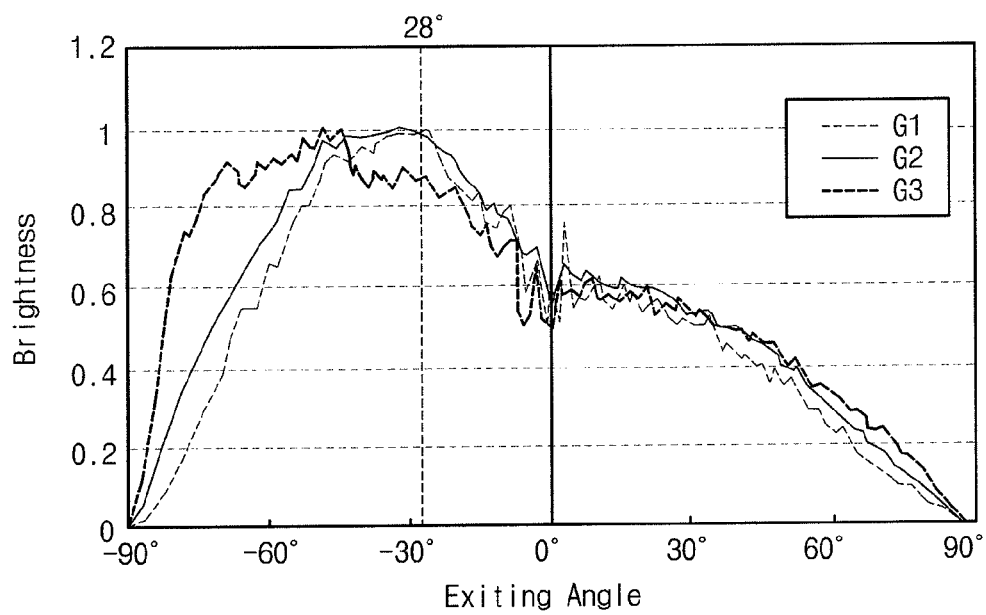

FIGS. 4A-1, 4B-1, 4C-1 and 4D-1 show dimensions of embossments. Particularly, FIG. 4A-1 shows first embossments P5 having a width of about 60 micrometers and a height of about 12 micrometers. FIG. 4B-1 shows two second embossments P6 having the same shape as the first embossment P5. The two second embossments P6 are partially overlapped with each other such that longitudinal axes of the two second embossments P6 are inclined at about 135 degrees with respect to each other. FIG. 4C-1 shows two third embossments P7 having the same shape as the first embossment P5. The two third embossments P7 are partially overlapped with each other such that longitudinal axes of the two third embossments P7 are inclined at about 90 degrees with respect to each other. Each of the third embossments P7 has a height of about 30 micrometers. FIG. 4D-1 shows fourth embossments P8 having a width of about 60 micrometers and a height of about 30 micrometers.

FIGS. 4A-2, 4B-2, 4C-2 and 4D-2 show brightness distribution as a function of light exiting angle for the respective embossment dimensions of FIGS. 4A-1, 4B-1, 4C-1 and 4D-1. In FIGS. 4A-2, 4B-2, 4C-2 and 4D-2, a first graph G1 represents a brightness distribution at a first area of the exiting surface 123, which is near the incident surface 121 of the light guide plate 120, a second graph G2 represents a brightness distribution at a center area of the exiting surface 123, and a third graph G3 represents a brightness distribution at a second area of the exiting surface 123, which is near the opposite surface 122 of the light guide plate 120.

Referring to FIGS. 4A-1 to 4D-1 and 4A-2 to 4D2, when the scattering patterns are formed in the shape of the embossments (i.e., without recesses being encircled by the embossments), brightness differences occur according to the shape of the scattering patterns when the brightness is measured at 28 degrees and the measured brightness is lower than that when the scattering patterns are formed in the shape of the recesses.

In addition, when the scattering patterns are formed in the shape of the embossments, the brightness difference occurs between the first area near the incident surface, the center area, and the second surface near the opposite surface. Consequently, the brightness uniformity of the backlight assembly 100 may be deteriorated due to the brightness difference.

However, as seen in FIG. 1, in an exemplary embodiment the scattering patterns can be formed as a combination of the recesses 125 and the embossments 126 on the reflection surface 124 of the light guide plate 120.

Figure 5:
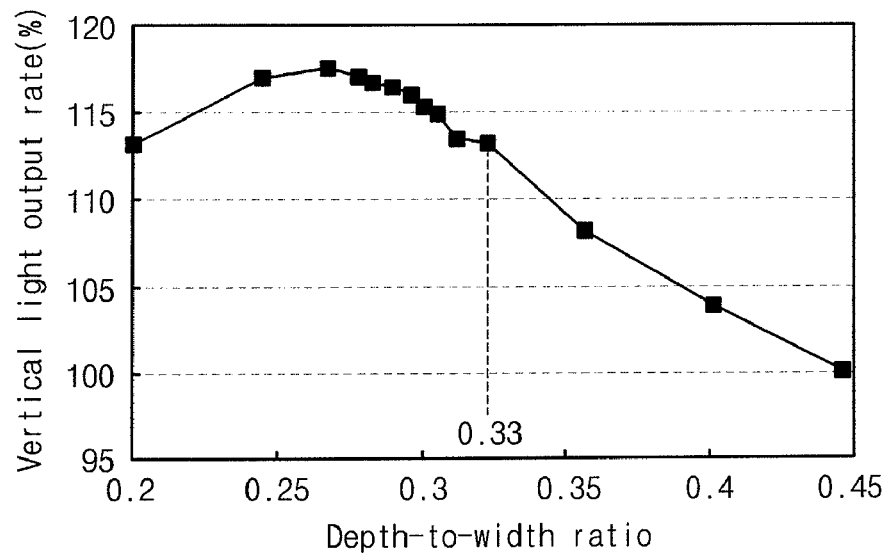
FIG. 5 is a graph showing a vertical light output rate of the light guide plate according to a depth-to-width ratio of the recesses.

FIG. 5 is a graph showing the vertical light output rate of the light guide plate as a function of the depth-to-width ratio of the recesses. In FIG. 5, the vertical light output rate has been shown according to the variation of the depth-to-width ratio on the assumption that the vertical light output rate is 100% when the depth-to-width ratio is about 0.45.

Referring to FIG. 5, when the depth-to-width ratio of the recesses 125 (shown in FIG. 2) is about 0.26, the vertical light output rate (%) of the light guide plate 100 (shown in FIG. 1) was measured as its highest level. However, when the depth-to-width ratio becomes greater or smaller than about 0.26, the vertical light output rate (%) decreases, but the hot spot may be prevented from being perceived due to the wide range of output angles.

Thus, the depth-to-width ratio, which includes the maximum vertical light output rate and the vertical light output rate at which the hot spot is not perceived, is set to the proper range. In an exemplary embodiment, the depth-to-width ratio of about 0.2 to about 0.33 is set to the proper range in which the vertical light output rate is of about 113%.

The recesses 125 can be formed on the reflection surface 124 using various processes such as a reflow process, an etching process, a sandblasting process, a laser processing process, or the like. Among them, in an exemplary embodiment, the laser processing process is used to form the recesses 125 since the size of the recesses 125 is easily adjusted in case of applying the laser processing process to form the recesses 125. Particularly, since a pulse rate of pulse signal and a size of driving current, which are applied to the laser used in the laser processing process, can be adjusted, the depth-to-width ratio of the recesses 125 can be finely adjusted.

Referring to FIG. 1 again, the reflection sheet 140 is disposed under the reflection surface 124 of the light guide plate 120 and reflects the light leaking through the reflection surface 124 toward the light guide plate 120.

The light guide plate 120 further includes embossments 126 that are positioned adjacent to the recesses 125 and protrude toward the reflection sheet 140 from the reflection surface 124.

The embossments 126 separate the reflection sheet 140 from the reflection surface 124 of the light guide plate 120 by a predetermined distance, thereby preventing the reflection sheet 140 from making contact with the light guide plate 120. If there is no air gap between the light guide plate 120 and the reflection sheet 140 due to the contact between the light guide plate 120 and the reflection sheet 140, the light guiding in the light guide plate 120 is scattered by the reflection sheet 140 or emitted from the light guide plate 120, thereby causing deterioration in brightness at the region in which the reflection sheet 140 makes contact with the light guide plate 120.

The embossments 126 are provided to form the air gap between the light guide plate 120 and the reflection sheet 140 and have a height equal to or higher than about 1.65 micrometers.

In an exemplary embodiment, the embossments 126 are a burr that is naturally formed adjacent to the recesses 125 when the recesses 125 are formed by the laser processing process.

Figure 6:
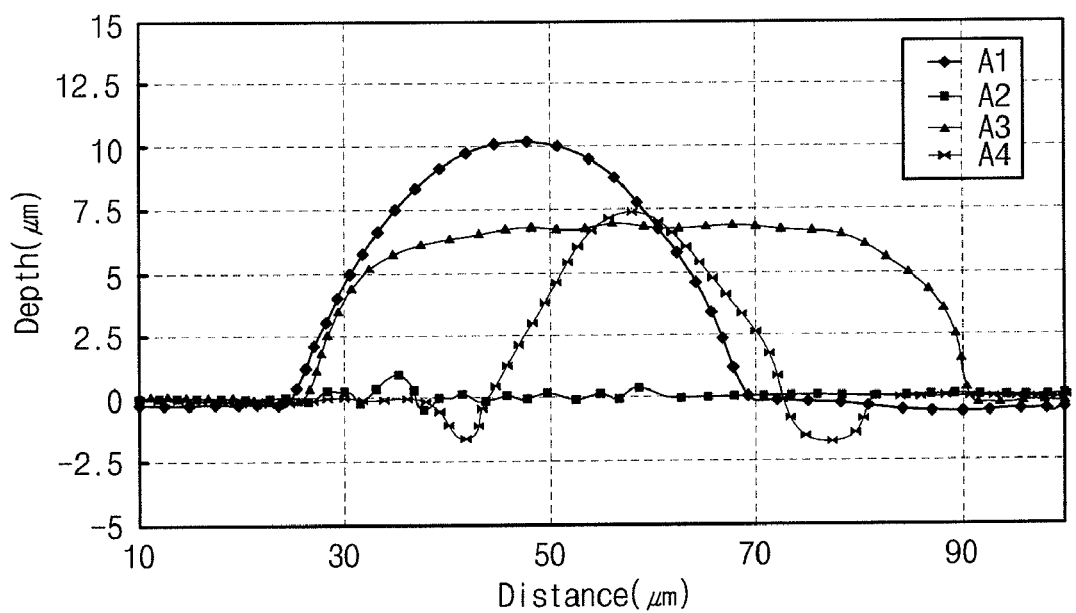
FIG. 6 is a graph showing depths of the recesses at various distances as a function of manufacturing method.

FIG. 6 is a graph showing shapes of the recesses according to various manufacturing methods. In FIG. 6, a first graph A1 represents a shape of recesses formed by a reflow process. A second graph A2 represents a shape of recesses formed by a sandblast process. A third graph A3 represents a shape of recesses formed by an etch process. A fourth graph A4 represents a shape of recesses formed by a laser processing process.

Referring to FIG. 6, in the case of the sandblast process, it is difficult to increase the size of the recess and to control the depth of the recess. In the etch process, the size of the recess is relatively large and the depth is difficult to be controlled. Accordingly, when using a sandblast process and an etch process, it is difficult to set the depth-to-width ratio of the recess to the range of about 0.2 to about 0.33.

Since the depth-to-width ratio of the recess can be easily set within the range of about 0.2 to about 0.33 when using the reflow process and the laser processing process, the reflow process and the laser processing process may be applied to form the recesses 125. In particular, a burr is naturally formed adjacent to the recesses 125 when the recesses 125 are formed by the laser processing process, so that no additional process is required to form the embossments 126. However, in the case where the reflow process is used to form the recesses 125, an additional process is needed to form the embossments 126. Accordingly, in an exemplary embodiment, the laser processing process is performed on the reflection surface of the light guide plate formed by the extrusion molding method, thereby substantially simultaneously forming both the recesses 125 and the embossments 126.

Figure 7:
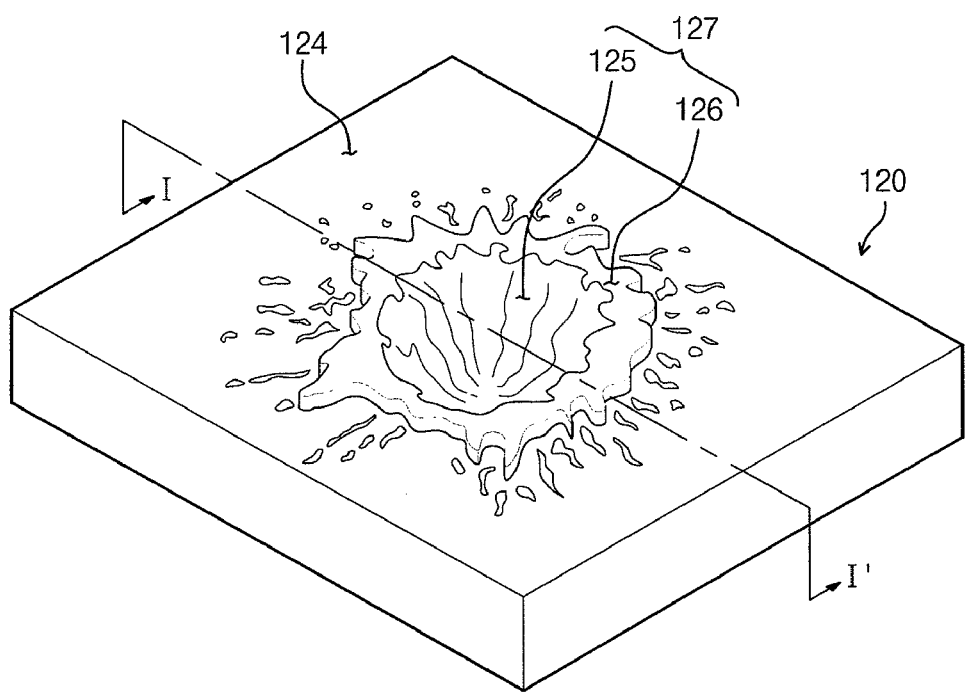
FIG. 7 is a perspective view depicting a portion of the reflection surface of the light guide plate of FIG. 1.
Figure 8:
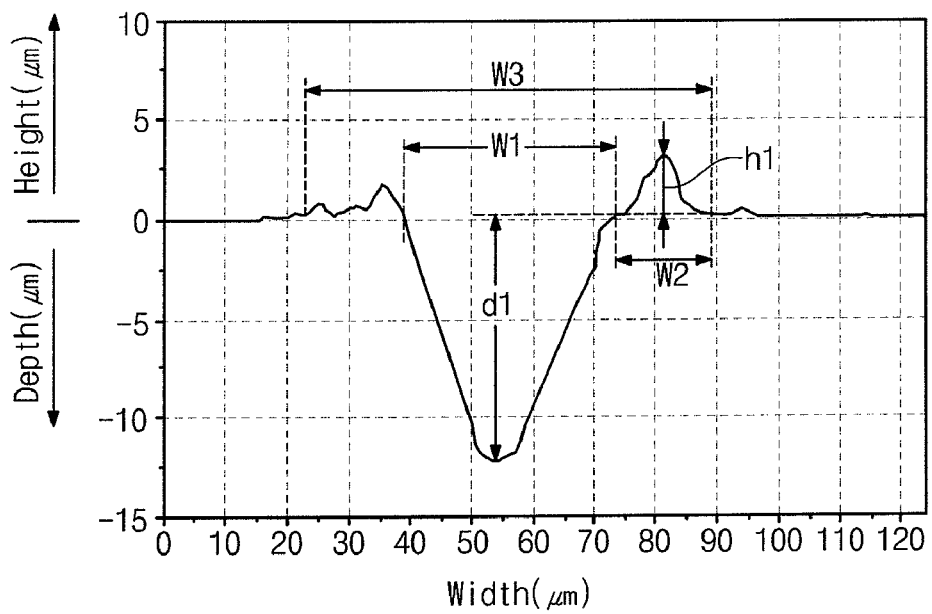
FIG. 8 is a graph showing a width, a depth, and a height of a representative recess and embossment taken along a line I-I' of FIG. 7.

FIG. 7 depicts a portion of a reflection surface of the light guide plate of FIG. 1, and FIG. 8 is a graph showing a width, a depth, and a height of a representative recess and embossment taken along a line I-I' of FIG. 7.

Referring to FIGS. 7 and 8, the recesses 125 and the embossments 126 are substantially simultaneously formed on the reflection surface of the light guide plate 120 by the laser processing process. A recess 125 and an embossment 126, which are formed by the laser processing process, are collectively called a laser pattern 127. Since the laser processing process is performed by irradiating the laser onto the reflection surface 124, the reflection surface 124 is rough, not smooth and even.

In an exemplary embodiment, when viewed orthogonal to the reflection surface 124, the recesses 125 are provided onto the reflection surface 124 in the shape of dot, and the recesses 125 have a cross-sectional shape of, for example, a semi-round shape or a semi-oval shape.

During the laser processing process, the burr is formed adjacent to the recesses 125 creating the embossments 126. The burr is naturally formed by the laser processing process, so that the burr has uneven height. In an exemplary embodiment, to prevent the light guide plate 120 from making contact with the reflection sheet 140 (as shown in FIG. 1), the burr has a height of about 1.65 micrometers. In addition, the height of the burr may be varied by adjusting the intensity of the laser irradiated onto the reflection surface 124.

In an exemplary embodiment, referring to FIG. 8, each of the recesses 125 has a depth d1 of about 7.2 micrometers and a width w1 of about 30 micrometers.

Accordingly, each of the recesses 125 has the depth-to-width ratio of about 0.24, which is depth d1 to width w1.

In addition, each of the embossments 126 has a height h1 of about 2 micrometers and a width w2 of about 8 micrometers. Thus, the sum w3 of the width w1 of the recesses 125 and the two widths w2 of the embossments 126 is about 46 micrometers, but the sum w3 of the width w1 and the two widths w2 should not be limited to this value. In an exemplary embodiment the sum w3 of the width w1 of the recesses 125 and the two widths w2 of the embossments 126 is 100 micrometers or less.

In FIGS. 7 and 8, the laser pattern 127 formed by irradiating the laser only once onto the reflection surface 124 has been shown, but the number of irradiations of the laser may be twice or more in order to obtain various shapes of the laser pattern 127.

Figure 9:
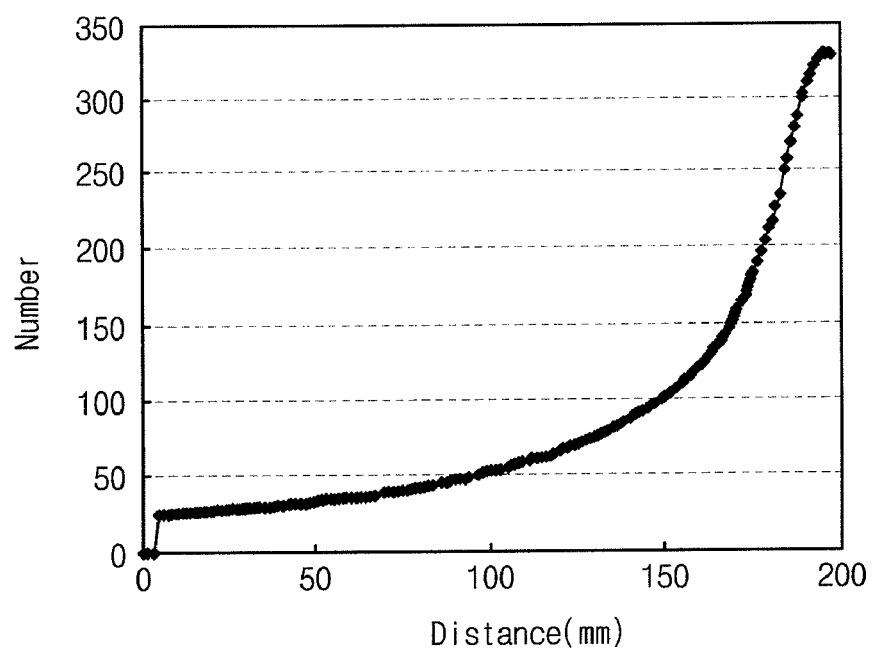
FIG. 9 is a graph showing a density of groups laser patterns.

FIG. 9 is a graph showing the density of groups (number) of laser patterns. In FIG. 9, an x-axis indicates a distance (mm) between the light source and the position at which the laser pattern is formed, and a y-axis represents the number of the individual laser patterns per unit area.

Referring to FIG. 9, the number of laser patterns 127 per unit area increases as the distance between the light source 111 (shown in FIG. 2) and the position at which the laser pattern is formed increases. In other words, since the incident region relatively close to the light source 111 has brightness higher than that of the opposite region relatively far from the light source 111, the number of the laser patterns 127 formed in the incident region is smaller than the number of the laser patterns 127 formed in the opposite region. As described above, when adjusting the number of the laser patterns 127, the brightness difference between the incident region and the opposite region may be reduced.

In addition, when the thickness of the light guide plate 120 decreases, the number of the laser patterns 127 per unit area, which are formed in the incident region, increases,. That is, when the thickness of the light guide plate 120 increases, the width of the incident surface 121 increases, so that the incident amount of the light increases. On the other hand, when the thickness of the light guide plate 120 decreases, the width of the incident surface 121 decreases, so that the incident amount of the light decreases. Accordingly, the number of the laser patterns 127, which are formed in the incident region, per unit area increases when the thickness of the light guide plate 120 is relatively thin as compared with when the thickness of the light guide plate 120 is relatively thick.

Figure 10:
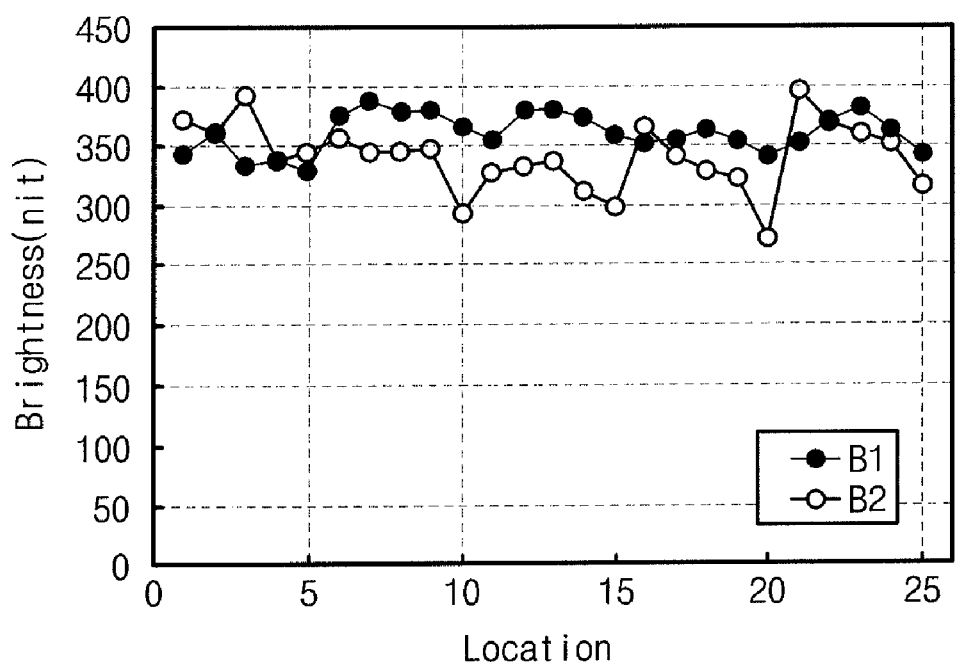
FIG. 10 is a graph showing the brightness distribution of light guide plates as a function of location comparing a conventional light guide plate to a light guide plate according to an exemplary embodiment of the present invention.

FIG. 10 is a graph showing the brightness distribution of the light guide plate. The first graph B1 represents the brightness distribution of the light guide plate according to the present invention and the second graph B2 represents the brightness distribution of a conventional light guide plate.

Referring to FIG. 10, the brightness of the light guide plate of the conventional light guide plate and the brightness of the light guide plate according to the present invention have been measured after the light having uniform intensity is applied to the conventional light guide plate and the light guide plate according to the present invention. As a result, an average brightness of the conventional light guide plate has been measured at about 337 nit, while an average brightness of the light guide plate according to the present invention has been measured at about 371 nit. In addition, the brightness uniformity of the conventional light guide plate has been measured at about 75% and the brightness uniformity of the light guide plate according to the present invention has been measured at about 85%.

As described above, in the case where the recesses 125 having a depth-to-width ratio of about 0.2 to about 0.33 are formed on the reflection surface 124 of the light guide plate 120, the brightness increases about 10.5% and the brightness uniformity increases about 10%. Thus, the brightness of the backlight assembly 100 can be improved when the recesses 125 are formed, thereby preventing occurrence of the hot spot and improving image display quality.

In addition, in the case where the brightness and the brightness uniformity of the light guide plate 120 are improved by forming the recesses 125, diffusion sheets or brightness enhancement films, which are disposed on the light guide plate 120, can be removed from the backlight assembly 100. Accordingly, the number of the sheets for the backlight assembly 100 can be reduced, thereby reducing manufacturing cost and the overall thickness of the backlight assembly 100.

According to the above, the recesses are formed on the reflection surface of the light guide plate to scatter the light incident thereto, and each of the recesses has the depth-to-width ratio of about 0.2 to about 0.33.

Thus, the light exiting angle from the light guide plate can be controlled in the range of about 25 degrees to about 30 degrees, so that two prism sheets disposed on the light guide plate can output the light vertically to the exiting surface of the light guide plate. As a result, brightness of the backlight assembly can be improved and the number of the sheets for the backlight assembly can be reduced.

Although exemplary embodiments of the present invention have been described, it is understood that the present invention should not be limited to these exemplary embodiments but that various changes and modifications can be made by those having ordinary skilled in the art within the spirit and scope of the present invention as hereinafter claimed.

What is claimed is:

1. A backlight assembly comprising:
   a light source that emits light; and
   a light guide plate that receives the light, that changes a path of the light, and that outputs the light,
   wherein the light guide plate comprises:
      an incident surface to which the light is incident and that is adjacent to the light source,
      an exiting surface from which the light exits and that extends from a first end of the incident surface,
      a reflection surface that extends from a second end of the incident surface and that faces the exiting surface,
      a recessed-carving scattering pattern of recesses on the reflection surface toward the exiting surface to scatter the light incident to the light guide plate, the recesses having a depth-to-width ratio of about 0.2 to about 0.33 and the reflection surface having an uneven surface roughness,
      a reflection sheet disposed adjacent the reflection surface to reflect light leaked from the light guide plate back toward the light guide plate, and
      an embossment adjacent to a respective recess, the embossment protruding from the reflection surface to separate the reflection sheet and the reflection surface.

2. The backlight assembly of claim 1, wherein the recessed-carving scattering pattern scatters the light such that light exiting from the exiting surface has an angle of about 25 degrees to about 30 degrees with respect to an imaginary direction line that is substantially vertical to the exiting surface.

3. The backlight assembly of claim 2, wherein the recesses are dot shaped when viewed orthogonal to the reflection surface.

4. The backlight assembly of claim 3, wherein a number of the recesses per unit area increases as a distance between the incident surface and a position at which a recess is formed increases.

5. The backlight assembly of claim 3, wherein a number of the recesses per unit area in an area adjacent to the incident surface, increases when a thickness of the light guide plate decreases.

6. The backlight assembly of claim 1, wherein a sum of a width of the recess and twice a width of the embossment is about 100 micrometers or less.

7. The backlight assembly of claim 6, wherein the light guide plate has a thickness of about 0.6 millimeters to about 1.2 millimeters, and the recess has a depth of about 5 micrometers to about 30 micrometers.

8. The backlight assembly of claim 1, wherein the embossment has an uneven height and a height of the embossment is about 1.65 micrometers or more.

9. The backlight assembly of claim 1, further comprising at least one prism sheet disposed on the exiting surface to condense the light exiting from the light guide plate.

10. The backlight assembly of claim 9, wherein the at least one prism sheet comprises:
    a first prism sheet having a plurality of first prisms extending substantially parallel to the exiting surface in a first direction; and
    a second prism sheet having a plurality of second prisms extending substantially parallel to the exiting surface in a second direction substantially perpendicular to the first direction.

11. The backlight assembly of claim 1, wherein the light source comprises a plurality of light emitting diodes.

12. The backlight assembly of claim 1, wherein the light sources are positioned adjacent to the incident surface.

13. A backlight assembly comprising:
    a light source that emits light; and
    a light guide plate that receives the light, that changes a path of the light, and that outputs the light,
    wherein the light guide plate comprises:
       an incident surface to which the light is incident and that is adjacent to the light source,
       an exiting surface from which the light exits and that extends from a first end of the incident surface,
       a reflection surface that extends from a second end of the incident surface and that faces the exiting surface, and
       a recessed-carving scattering pattern of recesses on the reflection surface toward the exiting surface to scatter the light incident to the light guide plate, the recesses having a depth-to-width ratio of about 0.2 to about 0.33 and the reflection surface having an uneven surface roughness,
wherein at least a pair of adjacent recesses partially overlap each other when the pair of adjacent recesses are viewed in a direction from the reflection surface toward the exiting surface.

* * * * *